United States Patent [19]
Tai et al.

[11] Patent Number: 5,241,997
[45] Date of Patent: Sep. 7, 1993

[54] APPARATUS AND METHOD FOR FILLING AND IMPREGNATING CAPACITORS WITH A CAPACITOR OIL

[75] Inventors: Shoji Tai; Shozo Hayashi; Hideyuki Dohi; Kunio Sugisawa, all of Yokohama, Japan

[73] Assignee: Nippon Petrochemicals Co., Ltd., Tokyo, Japan

[21] Appl. No.: 747,266

[22] Filed: Aug. 19, 1991

[30] Foreign Application Priority Data

Aug. 21, 1990 [JP] Japan .................................. 2-219457

[51] Int. Cl.$^5$ .......................... B65B 1/04; B65B 31/00
[52] U.S. Cl. ...................................... 141/67; 141/192; 141/237; 141/35; 118/400
[58] Field of Search ........................ 141/4, 5, 8, 11, 35, 141/36, 69, 82, 89, 92, 192, 234, 237, 98, 67; 427/79, 81; 118/400

[56] References Cited

U.S. PATENT DOCUMENTS 938,482 11/1909 Haller ...................................... 141/36
3,828,833 8/1974 Smith et al. .......................... 141/85

FOREIGN PATENT DOCUMENTS 56139241 3/1955 Japan .

Primary Examiner—Henry J. Recla
Assistant Examiner—Steven O. Douglas
Attorney, Agent, or Firm—Scully, Scott, Murphy & Presser

[57] ABSTRACT

A plurality of capacitors of the type each including capacitor elements with a very small gap between adjacent electrodes are filled and impregnated with a capacitor oil with the aid of a capacitor oil filling/impregnating apparatus. The apparatus comprises an impregnating chamber including a capacitor oil supplying portion, a charging/discharging platform having a plurality of capacitors placed thereon, and distributing/supplying means arranged above the charging/discharging platform so as to allow the capacitor oil to be supplied to the respective capacitors from above by its free falling-down induced by a dead weight of the capacitor oil itself. A capacitor oil filling/impregnating method is practiced with the aid of the foregoing apparatus by way of the steps of heating the interior of the impregnating chamber under a high level of vacuum to dry the respective capacitors on the charging/discharging platform, cooling the capacitors after completion of the drying operation, supplying the capacitor oil to each capacitor from a capacitor oil refining/supplying system via the capacitor oil supplying portion, keeping the capacitors still for a predetermined period of time after completion of the capacitor oil supplying operation, and allowing the capacitors to be impregnated with the capacitor oil.

7 Claims, 3 Drawing Sheets

APPARATUS AND METHOD FOR FILLING AND IMPREGNATING CAPACITORS WITH A CAPACITOR OIL

BACKGROUND OF THE INVENTION

1. FIELD OF THE INVENTION

The present invention relates generally to an apparatus and a method for filling and impregnating a plurality of capacitors with a capacitor oil. More particularly, the present invention relates to an apparatus and a method for filling and impregnating a plurality of capacitors with a capacitor oil wherein each of the capacitors includes capacitor elements while a gap between adjacent electrodes is minimized to improve electrical stress.

2. DESCRIPTION OF THE RELATED ART

Hitherto, when capacitors each including capacitor elements with a very small gap between adjacent electrodes are filled with a capacitor oil (electrical insulating oil) while the capacitor oil is sufficiently impregnated in the space between the electrodes, each capacitor is first cleaned, and thereafter, the capacitor is filled with the capacitor oil without any stay of air bubbles in the capacitor.

To facilitate understanding of the present invention, a typical conventional capacitor oil filling/impregnating apparatus will briefly be described below with reference to FIG. 4.

A conventional condensor oil filling/impregnating apparatus 1 as shown in FIG. 4 includes as essential components an impregnating chamber 2 in which a plurality of capacitors a are settled, a capacitor oil storage tank 3 for supplying a capacitor oil therefrom to the impregnating chamber 2, a deaerating column 4, a filter 5 and a clay treating vessel 6. When the respective capacitors a are filled with the capacitor oil, first, the interior of the impregnating chamber 2 is heated by heating means (not shown) while the capacitors a held in an immersing bath 7 are airtightly received in the impregnating chamber 2. Then, the impregnating chamber 2 is evacuated by driving a vacuum pump (not shown) so that the respective capacitors a are dried (for the purpose of removing unnecessary materials from the capacitors a).

After completion of drying, the respective capacitors are cooled for impregnation. And then, a capacitor oil is supplied to the immersing bath 7 from the capacitor oil storage tank 3 so that the condensors a are filled with the capacitor oil while they are immersed in the immersing bath 7. When it is confirmed that a predetermined quantity of capacitor oil is supplied to the immersing tank 7, the capacitor oil supplying operation is interrupted. Then, while the capacitors a are immersed in the immersing bath 7, they are kept still so as to allow each capacitor a, particularly, a spacer (made of a paper or similar material) interposed between adjacent electrodes as a capacitor element to be sufficiently impregnated with the capacitor oil.

On completion of the filling/impregnating operations for the respective capacitors a, a charging/discharging platform (in the form of a wagon) having the immersing bath 7 mounted thereon is displaced outside of the impregnating chamber 2. At this time, a single filling cycle of the capacitor oil filling/impregnating apparatus 1 has been finished. Subsequently, the remaining capacitor oil is recovered from the immersing bath 7 so that the recovered capacitor oil is returned to the clay treating vessel 6 in which it is subjected to refining. The refined condensor oil is then delivered from the clay treating vessel 6 to the oil reserving tank 3 again via the filter 5 and the deaerating column 4 until the oil reserving tank 3 is supplemented with a predetermined quantity of new capacitor oil. In FIG. 4, reference numeral 8 designates a delivery pump.

In addition, a proposal has been made as to a capacitor oil filling/impregnating apparatus as disclosed in an official gazette of Japanese Unexamined Publication Utility Model (Kokai) No. 56-139241. According to this proposal, the apparatus includes an unit for supplying a capacitor oil to each capacitor via an airtightly closed passage which leads to the interior of the capacitor. After the respective capacitors are deaerated and dried in a separate unit arranged independent of the apparatus, they are filled with the capacitor oil in another separate unit. As the filling operation is performed for the respective capacitors, the capacitor oil is properly supplied to them with the aid of a delivery pump and a flow rate adjusting device.

As is apparent from the above description, since the conventional capacitor oil filling/impregnating apparatus is constructed such that respective capacitors are filled and impregnated with a capacitor oil by employing an immersing process to be practiced with the aid of an immersing bath, the capacitor oil flows outside of a case of each capacitor during filling/impregnating operations in an immersed state by a quantity more than a half of the capacitor oil which has been supplied from the capacitor oil storage tank. Since the capacitor oil is expensive, the conventional apparatus includes a recirculating system which is connected to the clay treating vessel, the filter and the deaerating column in order to recover the capacitor oil which has not been filled in the respective capacitors and then reuse it after it is subjected to refining.

However, since a large quantity of capacitor oil is not practically used for the respective capacitors during a filling operation, and moreover, there is a need of enlarging a capacity of each of the clay treating veseel, the filter and the deaerating column for the purpose of removing impurities derived from a refining operation for the capacitor oil recovered from the immersing bath, it is unavoidably necessary that a capacity of each of driving units arranged in the recirculating system is enlarged. Consequently, there arises a problem that the whole capacitor oil filling/impregnating apparatus is constructed in larger dimensions.

In addition, as far as the immersing process is employed for the capacitor oil filling/impregnating apparatus, there arises another problem that all the capacitors are not uniformly filled with the capacitor oil, and moreover, a long time is taken until each capacitor is sufficiently impregnated with the capacitor oil.

SUMMARY OF THE INVENTION

The present invention has been made in consideration of the foregoing background.

An object of the present invention is to provide an apparatus and a method for filling and impregnating a plurality of capacitors with a capacitor oil wherein a filling operation can be performed by using a reduced quantity of capacitor oil within a short period of time with high capacitor production efficiency.

Other object of the present invention is to provide an apparatus and a method for filling and impregnating a plurality of capacitors with a capacitor oil wherein a filling operation can be performed at an improved operational efficiency.

Another object of the present invention is to provide an apparatus and a method for filling and impregnating a plurality of capacitors with a capacitor oil wherein a capacitor oil is used in a highly economical manner.

To accomplish the above objects, there is provided according to one aspect of the present invention an apparatus for filling and impregnating a plurality of capacitors with a capacitor oil, wherein the apparatus comprises an impregnating chamber including a capacitor oil supplying portion so as to allow the respective capacitors to be supplied with the capacitor oil via the capacitor oil supplying portion, a charging/discharging platform having the capacitors placed thereon, the charging/discharging platform being introduced into the impregnating chamber before the capacitors are filled and impregnated with the capacitor oil, while the charging/discharging platform being displaced outside of the impregnating chamber when filling and impregnating operations are completed, and discharging/supplying means arranged above the charging/discharging platform in such a manner that the distributing/supplying means can be connected to the capacitor oil supplying portion so as to allow the capacitor oil to be supplied to the respective capacitors on the charging/discharging platform from above by its free falling-down induced by a dead weight of the capacitor oil itself.

The distributing/supplying means is composed of an overflow passage portion including a plurality of connection pipes each of which is inserted into an inlet port of each capacitor, a part of the overflow passage portion being opened to the interior of the impregnating chamber, and a supplying passage portion detachably connected to the capacitor oil supplying portion, the supplying passage portion including a plurality of resistance pipes which are inserted into the connection pipes of the overflow passage portion so as to allow the capacitor oil to be supplied to the respective capacitors from above its free falling-down induced by a dead weight of the capacitor oil itself.

To assure that the respective capacitors are easily dried and impregnated with the capacitor oil prior to a capacitor oil supplying operation, the impregnating chamber is provided with a plurality of heating/cooling means each of which is located adjacent to capacitor(s) to be filled and impregnated with the capacitor oil.

In addition, according to other aspect of the present invention, there is provided a method of filling and impregating a plurality of capacitors with a capacitor oil with the aid of a capacitor oil filling/impregnating apparatus comprising an impregnating chamber including a capacitor oil supplying portion, a charging/discharging platform having the capacitors placed thereon, and distributing/supplying means arranged above the charging/discharging platform so as to allow the capacitor oil to be supplied to the respective capacitors from above by its free falling-down induced by a dead weight of the capacitor oil itself, wherein the method is practiced by way of the steps of heating the interior of the impregnating chamber under a high level of vacuum to dry the respective capacitors placed on the charging/discharging platform, cooling the respective capacitors after completion of the drying operation, supplying the capacitor oil to the respective capacitors from a capacitor oil refining/supplying system via the condensor oil supplying portion and the distributing/supplying means, keeping the respective capacitors still for a predetermined period of time after completion of the capacitor oil supplying operation, and allowing the respective capacitors to be impregnated with the capacitor oil.

The capacitor oil refining/supplying system is composed of a capacitor oil storage tank connected to the impregnating chamber, a deaerating column, a heater, a clay treating vessel and a raw material storage tank so that a capacitor oil supplied from the raw material storage tank is properly refined during its flowing through the foregoing components. The refined capacitor oil is temporally stored in the capacitor oil storage tank and a required quantity of refined capacitor oil is then delivered to the impregnating chamber.

Other objects, feature and advantages of the present invention will become apparent from reading of the following description which has been made in conjunction with the accompanying drawings.

BRIEF DESCRIPTION OF THE DRAWINGS

The present invention is illustrated in the following drawings in which.

DESCRIPTION OF THE PREFERRED EMBODIMENT

Figure 3:
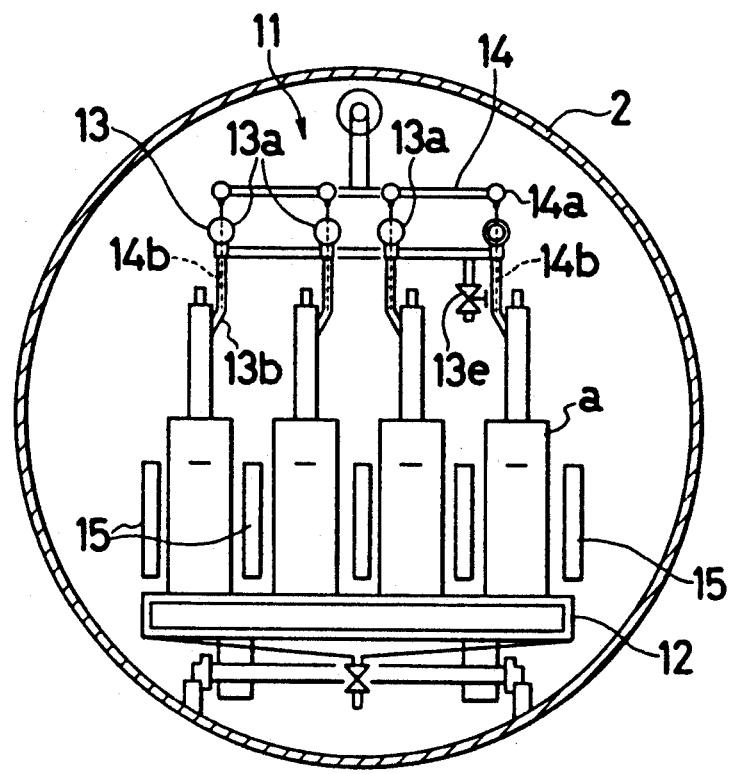
FIG. 3 is a cross-sectional view of an impregnating vessel constituting the apparatus shown in FIG. 1.
Figure 4:
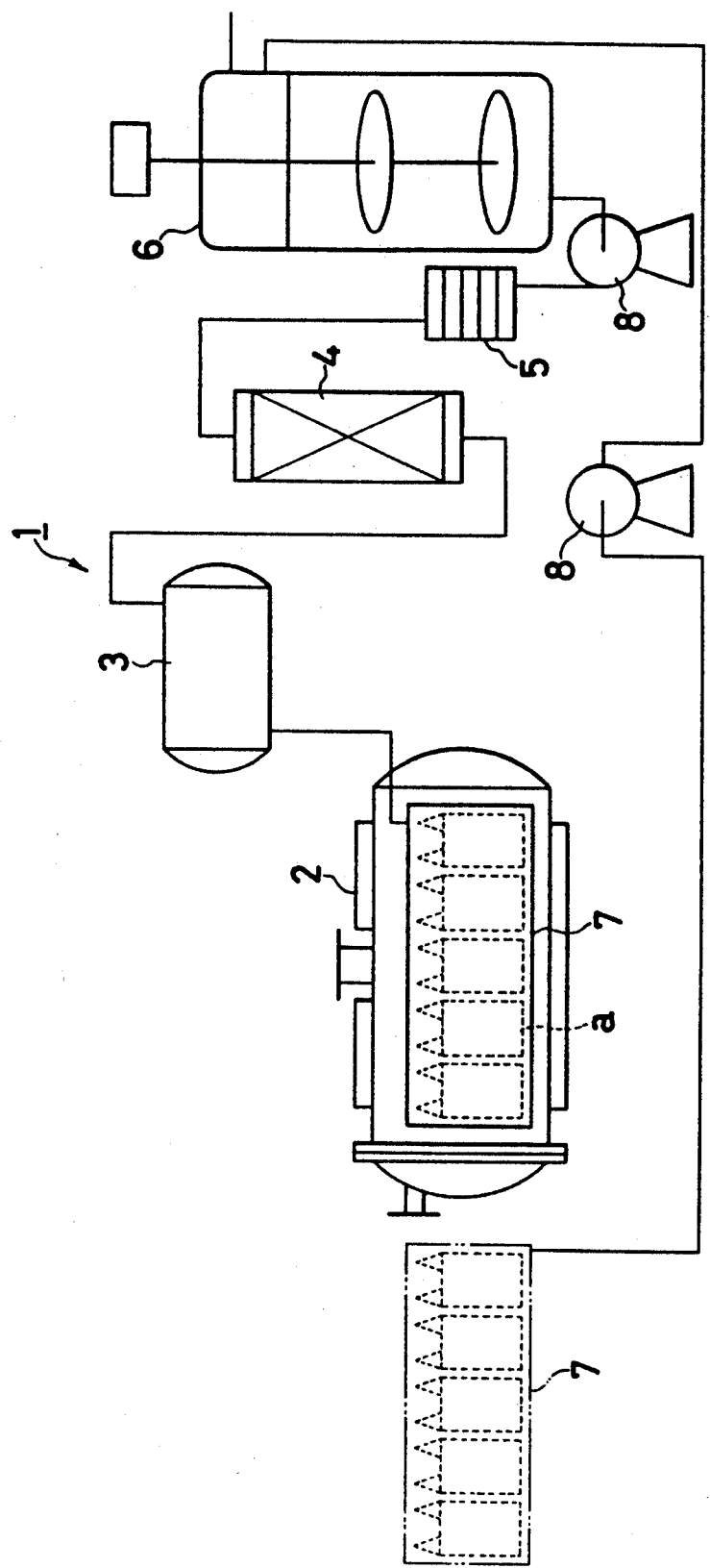
FIG. 4 is an illustrative view similar to FIG. 1, particularly showing the structure of a conventional capacitor oil filling/impregnating apparatus.

Now, the present invention will be described in detail hereinafter with reference to FIG. 1 to FIG. 3 which illustrate a preferred embodiment of the present invention. It should be noted that same components to those shown in FIG. 4 which illustrate a conventional capacitor oil filling/impregnating apparatus are designated by same reference numerals.

Figure 1:
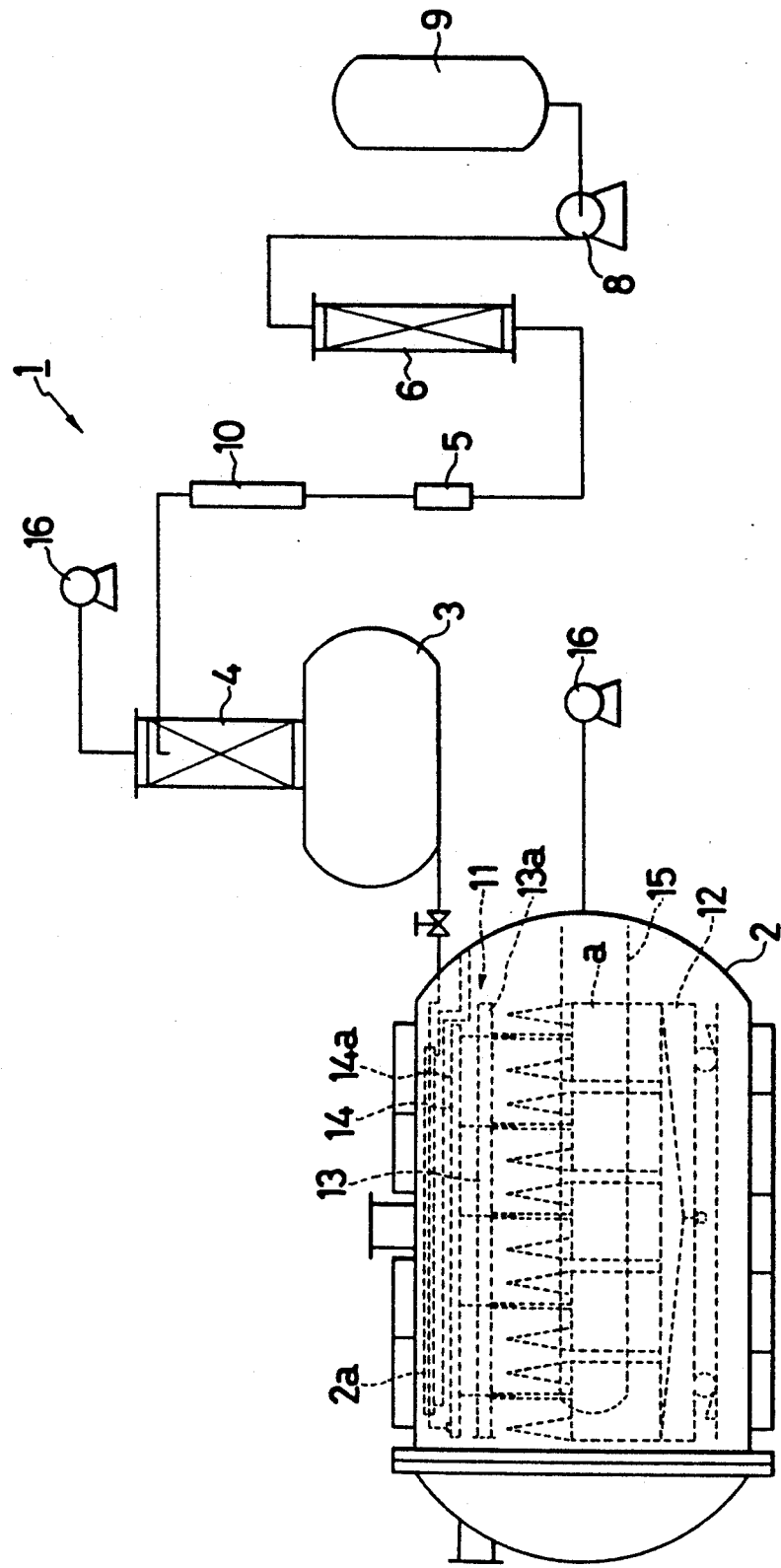
FIG. 1 is an illustrative view which schematically shows the structure of a capacitor oil filling/impregnating apparatus in accordance with an embodiment of the present invention.

As shown in FIG. 1, a capacitor oil filling/impregnating apparatus 1 in accordance with the embodiment of the present invention is essentially composed of an impregnating system including an impregnating chamber 2 and a refining/supplying system for supplying a capacitor oil from the raw material storage tank 9 side. Specifically, the refining/supplying system is composed of a capacitor oil storage tank 3 connected to the impregnating chamber 2, a deaerating column 4, a heater 10, a filter 5, a clay treating vessel 6 and a raw material storage tank 9 so that a capacitor oil supplied from the raw material storage tank 9 is properly refined during its flowing through the aforementioned components. The refined capacitor oil is temporally stored in the oil storage tank 3 and a required quantity of refined oil is then delivered to the impregnating system. It should be noted that the capacitor oil is slowly supplied to the impregnating system by its free falling-down induced by a dead weight of the capacitor oil itself.

The impregnating chamber 2 includes distributing/supplying means 11 which is detachably fitted to a capacitor oil supplying portion 2a. The distributing/supplying means 11 is normally placed on a charging/discharging platform 12 which serves to charge in or discharge from the impregnating vessel 2 a plurality of capacitors a each including condensor elements (not shown).

Figure 2:
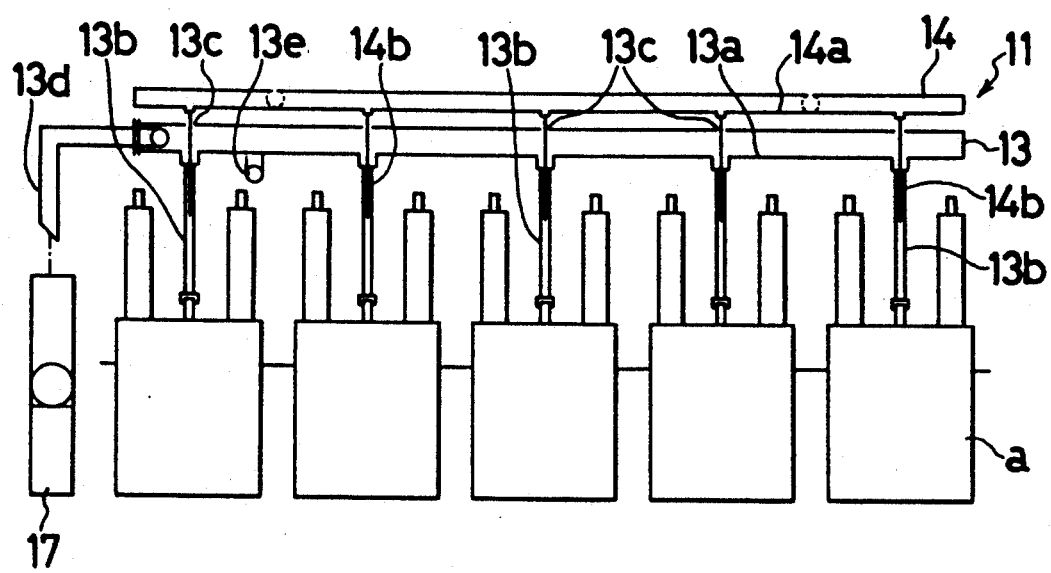
FIG. 2 is a fragmentary illustrative view of the apparatus shown in FIG. 1, particularly showing arrangement of distributing/supplying means.

As shown in FIG. 2, the distributing/supplying means 11 is constructed such that a capacitor oil is supplied to each of a plurality of capacitors a from above. To assure that each capacitor a is uniformly filled with the capacitor oil a, the distributing/supplying means 11 includes an overflow passage portion 13 and a supply passage portion 14 arranged above the overflow passage portion 13.

The overflow passage portion 13 is composed of a plurality of main pipes 13a extending in the longitudinal direction of the impregnating chamber 2 and a plurality of connection pipes 13b extending downward of the main pipes 13a corresponding to the respective capacitors a. Each connection pipe 13b is removably fitted into an inlet port of each capacitor a. Each main pipe 13a is formed with a plurality of ventilation holes 13c each of which is located above the branching location where the connection pipe 13b is branched from the main pipe 13a. In addition, each main pipe 13a includes an overflow port 13d at its left-hand end as seen in FIG. 2. Further, each main pipe 13a is equipped with a drain valve 13e at the position located below the main pipe 13a.

On the other hand, the supplying passage portion 14 is composed of a plurality of main pipes 14a extending in the longitudinal direction of the impregnating chamber 2 so as to be connected to a capacitor oil supplying portion 2a and a plurality of resistance pipes 14b branched from the main pipes 14a at the position where each resistance pipe 14b is inserted into the corresponding connection pipe 13b. After a capacitor oil reaches to the resistance pipe 14b from the capacitor oil supplying portion 2a via the corresponding main pipe 14a, the capacitor oil of which supplying speed is determined depending on a dead weight of the capacitor oil itself and a diameter of the resistance pipe 14b freely falls down by its own gravity force so that it is introduced into a case of each capacitor a.

Each connection pipe 13b has an inner diameter which is dimensioned so as not to allow it to be closed with the corresponding resistance pipe 14b. It should be added that each connection pipe 13b is constructed in a double-walled structure which does not obstruct not only supplying of the capacitor oil through the corresponding resistance pipe 14b but also raising-up of a surface level of the capacitor oil (i.e., overflowing) in the corresponding connection pipe 13c as well as raising-up of air bubbles in the same.

In FIG. 1, reference numeral 15 designates a heating-/cooling unit which is installed at the position adjacent to capacitor(s) a in the impregnating vessel 2. Each heating/cooling unit 15 serves to heat or cool a container of each capacitor a. Usually, the interior of the impregnating chamber 2 is kept in a vacuum state with poor thermal conductivity. However, since each heating/cooling unit 15 is installed adjacent to the capacitor(s) a, a heating/cooling operation can be performed with improved efficiency. To improve an operational efficiency of the heating/cooling unit 15, it is recommendable that it has a number of fins formed thereon. With such construction, a heating/cooling operation can be performed within a short period of time with the result that a time required for drying each capacitor can be shortened substantially. In other words, the number of steps required for finishing a single cycle for filling and impregnating a plurality of capacitors with the capacitor coil can be reduced.

It should be noted that a thermal medium for the heating/cooling units 15 is supplied to the capacitor oil supplying portion 2a in such a manner that a temperature of each capacitor after completion of heating and drying operations is substantially equalized to a temperature of the capacitor oil to be supplied to each capacitor. Alternatively, a heater may be installed in the oil storage tank with the same advantageous effects as those mentioned above.

When a filling operation is performed with the apparatus of the present invention, first, a plurality of capacitors a are properly placed on the charging/discharging platform 12 and each connection pipe 13b of the distributing/supplying means 11 is connected to the corresponding capacitor a. Then, the charging/discharging platform 12 having the capacitors a placed thereon is introduced into the impregnating chamber 2 by its rolling movement along rails. After a connecting operation is completed for the respective components, the impregnating chamber 2 is airtightly closed with a cover. As a degree of vacuum in the impregnating chamber 2 is raised up while performing a heating operation, the capacitors a on the charging/discharging platform 12 are deaerated and dried in the impregnating chamber 2. While each capacitor is connected to the corresponding connection pipe 13b, the interior of each capacitor a is deaerated and dried by discharging vapor of foreign materials or impurities on the capacitor a via the corresponding ventilation hole 13c. In FIG. 1, reference numeral 16 designates a vacuum pump.

After completion of the deaeration and drying operation, the temperature is lowered and a capacitor oil is then supplied to the respective capacitors a. Thus, the capacitor oil, of which supplying speed is determined depending on a dead weight of the capacitor oil itself and a diameter of each resistance pipe 14b, naturally falls down in the above-described manner so that it is introduced into a case of each capacitor a. In other words, supply of the capacitor oil is accomplished under a condition that a supplying speed of the capacitor oil suitable for an impregnating operation is determined based on a diameter of each resistance pipe 14b. It should be added that adjustment may be made such that a supply pressure employable for the impregnating chamber 2 is kept at a predetermined level by installing a delivery pump or the like at an intermediate position of the capacitor oil supply passage depending on the position where the oil storage tank 3 is installed, as desired.

Although a filling time differs from capacitor to capacitor, the capacitor oil is continuously supplied to the respective capacitors a through the main pipes 14a in the supplying passage portion 14. When a surface level of the condensor oil starts to be raised up after each capacitor a is filled with the capacitor oil, the capacitor oil spills downward through each overflow port 13d. A float switch 17 is disposed at the position located opposite to the overflow port 13d so that supplying of the capacitor oil from the oil storage tank 3 is interrupted when discharging of the capacitor oil through the overflow port 13d is detected by the float switch 17. In other words, completion of a supplying operation of the capacitor oil can be detected by the float switch 17. It should be noted that interruption of the supplying operation of the capacitor oil should not be limited only to the case where completion of the supplying operation of the same is detected by the float switch 17. Alternatively, completion of the supplying operation may be detected by employing other detecting means.

As is apparent from the above description, according to the present invention, since each capacitor is gradually supplied with the capacitor oil, an impregnating operation can be performed without any production of unacceptable capacitors within a shorter period of impregnation time than that of the conventional capacitor oil filling/impregnating apparatus for which an immersing process is employed. Basically, the impregnation time can previously be calculated in consideration of supplying of a predetermined quantity of capacitor oil in connection with the process of impregnating each capacitor with the capacitor oil. As long as the conventional immersing process is employed, the impregnation time is elongated unavoidably. In contrast with the conventional apparatus, it has been found from results derived from experiments that the impregnation time can be shortened with the capacitor oil filling/impregnating apparatus of the present invention. It should be noted that each capacitor may be supplied with the capacitor oil again after completion of an impregnation operation.

After a certain time elapses while the respective filled/impregnated capacitors a are kept still, the capacitors a placed on the charging/discharging platform 12 are displaced outside of the impregnating chamber 2 together with the distributing/supplying means 11 and the spilled capacitor oil is then drained by opening the drain valves 13e. Thereafter, the connection pipes 13b are disconnected from the respective capacitors a so that the capacitor oil remaining in the connection pipes 13b is drained to the outside. In such manner, a single cycle of capacitor oil filling/impregnating operations has been finished.

Next filling/impregnating operations are repeatedly performed by placing a plurality of new capacitors on the charging/discharging platform 12, connecting the connection pipes 13b to the respective capacitors and then introducing the platform 12 into the impregnating chamber 2. While the capacitor oil remaining in the distributing/supplying means 11 is drained in the above-described manner after the charging/discharging platform 12 is displaced outside of the impregnating chamber 2, the capacitor oil adhering to the distributing/supplying means 11 can completely be removed by heating and drying the distributing/supplying means under a high degree of vacuum during a subsequent filling/impregnating cycle.

As is apparent from the above description, with the apparatus and the method of the present invention, since each capacitor is reliably filled with the capacitor oil without any fluctuation in a filled state from capacitor to capacitor by free falling-down of the capacitor oil through the resistance pipes, production of capacitors each properly filled and impregnated with the capacitor oil can be achieved within a short period of time at a high operational efficiency.

In addition, since the capacitor oil is introduced directly into each capacitor, there does not arise a problem that a refined capacitor oil to be filled and impregnated in each capacitor is contaminated with foreign materials, and moreover, a large quantity of capacitor oil is not practically used for the respective capacitors. Thus, there is no need of enlarging a capacity of each unit required for refining the recovered capacitor oil, because a very few quantity of capacitor oil is recovered from the apparatus. Consequently, the whole apparatus can be constructed in smaller dimensions.

While the present invention has been described above with respect to a single preferred embodiment, it should of course be understood that the present invention should not be limited only to this but various changes or modifications may be made without departure from the scope of the invention as defined by the appended claims.

What is claimed is:

1. An apparatus for filling and impregnating a plurality of capacitors with a capacitor oil, comprising;
    an impregnating chamber including a capacitor oil supplying portion so as to allow said capacitors to be supplied with said capacitor oil via said capacitor oil supplying portion,
    a charging/discharging platform adapted to support said capacitors thereon, said charging/discharging platform being introduced into said impregnating chamber before said capacitors are filled and impregnated with said capacitor oil, while said charging/discharging platform being displaced outside of said impregnating vessel when filling and impregnating operations are completed, and
    distributing/supplying means arranged above aid charging/discharging platform wherein said distributing/supplying means is composed of an overflow passage portion including a plurality of connection pipes each of which being inserted into an inlet port of each capacitor, a part of said overflow passage portion being opened to the interior of the impregnating chamber, and a supplying passage portion detachably connected to said capacitor oil supplying portion, said supplying passage portion including a plurality of resistance pipes which are inserted into said connection pipes of said overflow passage portion so as to allow said capacitor oil to be gravity fed to the respective capacitors from above.

2. The apparatus as claimed in claim 1, wherein said overflow passage portion further includes a plurality of main pipes extending in the longitudinal direction of the impregnating chamber so that said connection pipes are branched from said main pipes while extending therefrom in the downward direction.

3. The apparatus as claimed in claim 2, wherein each main pipe is formed with a plurality of ventilation holes each of which is located above the branching location where each connection pipe is branched from the corresponding main pipe.

4. The apparatus as claimed in claim 2, wherein each main pipe is provided with a float switch at its open end so as to detect discharging capacitor oil from the open end of said main pipe upon completion of a capacitor oil supplying operation.

5. The apparatus as claimed in claim 2, wherein each main pipe is provided with a drain valve so as to drain the remaining capacitor oil after completion of filling and impregnating operations.

6. The apparatus as claimed in claim 1, wherein said supplying passage portion further includes a plurality of main pipes extending in the longitudinal direction of the impregnating vessel so as to be connected to said capacitor oil supplying portion, said main pipes having said resistance pipes branched therefrom at the positions where said resistance pipes are inserted into the corresponding connection pipes.

7. The apparatus as claimed in claim 1, wherein said impregnating chamber is provided with a plurality of heating/cooling means each of which is located adjacent to capacitor(s) to be filled and impregnated with the capacitor oil.

* * * * *

UNITED STATES PATENT AND TRADEMARK OFFICE
CERTIFICATE OF CORRECTION

PATENT NO. : 5,241,997
DATED : September 7, 1993
INVENTOR(S) : Shoji Tai, et al.

It is certified that error appears in the above-indentified patent and that said Letters Patent is hereby corrected as shown below:

```
        Column 6, line 7:   after "capacitor" insert
--a--
        Column 6, line 28:  after "capacitor" insert
--a--
        Column 8, line 22, Claim 1:  "aid" should
read as --said--
```

Signed and Sealed this

Twenty-ninth Day of March, 1994

Attest:

BRUCE LEHMAN

*Attesting Officer*     *Commissioner of Patents and Trademarks*